United States Patent
Kaelberer et al.

(10) Patent No.: US 6,239,519 B1
(45) Date of Patent: May 29, 2001

(54) ELECTRICAL MACHINE, IN PARTICULAR CLAW POLE GENERATOR

(75) Inventors: Peter Kaelberer, Gerlingen; Heinz Lauterbach, Esslingen; Klaus Reymann, Gerlingen; Uwe Knappenberger, Muehlacker, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/490,710

(22) Filed: Jan. 24, 2000

(30) Foreign Application Priority Data

Jan. 23, 1999 (DE) .......................................... 299 01 126 U

(51) Int. Cl.[7] .............................. H02K 9/00; H02K 1/32
(52) U.S. Cl. ................................ 310/61; 310/58; 310/59; 310/60 R; 310/60 A; 310/64; 310/263
(58) Field of Search .................................. 310/52, 58, 59, 310/60 R, 61, 62, 60 A, 65, 263, 261; 29/596–598

(56) References Cited

U.S. PATENT DOCUMENTS

| | | | |
|---|---|---|---|
| 4,584,496 | * 4/1986 | Frister ............................... | 310/60 R |
| 4,617,485 | * 10/1986 | Nakamura et al. .................. | 310/65 |
| 5,107,968 | * 4/1992 | Delpassand ......................... | 244/121 |
| 5,306,977 | * 4/1994 | Hayashi ............................... | 310/263 |
| 5,532,663 | * 7/1996 | Herd et al. .......................... | 335/216 |
| 5,977,668 | * 11/1999 | Yoshioka ............................. | 310/62 |

FOREIGN PATENT DOCUMENTS 34 10 760 C 2     9/1985 (DE) .

* cited by examiner

Primary Examiner—Tran Nguyen
(74) Attorney, Agent, or Firm—Michael J. Striker

(57) ABSTRACT

An electrical machine formed as claw pole generator has a ring-shaped stator provided with windings, a claw pole rotor rotatably arranged inside an opening of the stator, the claw pole rotor having a rotor shaft and an exciter coil arranged coaxially to the rotor shaft, the claw pole rotor also having a peripheral surface provided with a plurality of claw poles which overlap the exciter coil and engage in a finger-like manner with groove-shaped intermediate spaces, at least one axially acting fan units arranged at an end side of the claw pole rotor in a region of an outer periphery, and a plurality of honeycombed structures located in the intermediate spaces and extending in a longitudinal direction of the intermediate spaces so that a cooling medium flows through the structures.

5 Claims, 3 Drawing Sheets

ELECTRICAL MACHINE, IN PARTICULAR CLAW POLE GENERATOR

BACKGROUND OF THE INVENTION

The present invention relates to an electrical machine, in particular a claw pole generator.

One of such generators is disclosed for example in the German patent document DE-PS 34 10 760. It however has the disadvantage that because of the groove-shaped intermediate spaces between the claws of the rotor, an insufficient ventilation and thereby also cooling take place. The groove-shaped intermediate spaces between the pole claws form relatively visible passages with the toothed stator wall which runs above. It has been shown that relatively large-volume whirl is produced in these intermediate spaces, and during alternating action with the pole claws or the stator, leads to noise emission. Further, the cross-section of the groove-shaped intermediate spaces periodically changes with the rotary movement due to the structure of the grooveslots in the stator wall. Thereby periodic pressure fluctuations are induced, which lead to noises in corresponding frequency band. The known air guiding vanes inserted in the intermediate spaces of the pole claws can further increase this noise.

SUMMARY OF THE INVENTION

Accordingly, it is an object of the present invention to provide an electrical machine of the above mentioned general type, which avoids the disadvantages of the prior art.

In keeping with these objects and with others which will become apparent hereinafter, one feature of the present invention resides, briefly stated in an electrical machine, in particular a claw pole generator, in which in the intermediate spaces in their longitudinal direction, honeycombed structures through which a cooling medium passes, are arranged.

When the electrical machine is designed in accordance with the present invention it has the advantage that by closing the intermediate spaces between the claw poles, the large-volume whirl can not form any more. Thereby a significant noise reduction and an improved cooling are achieved. A further advantage is that the honeycombs which fill the intermediate spaces have a low weight with a high strength, in particular when the honeycombed structures have a light weight construction. Finally, the cooling of the rotor is improved because the passing air is no longer whirled.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
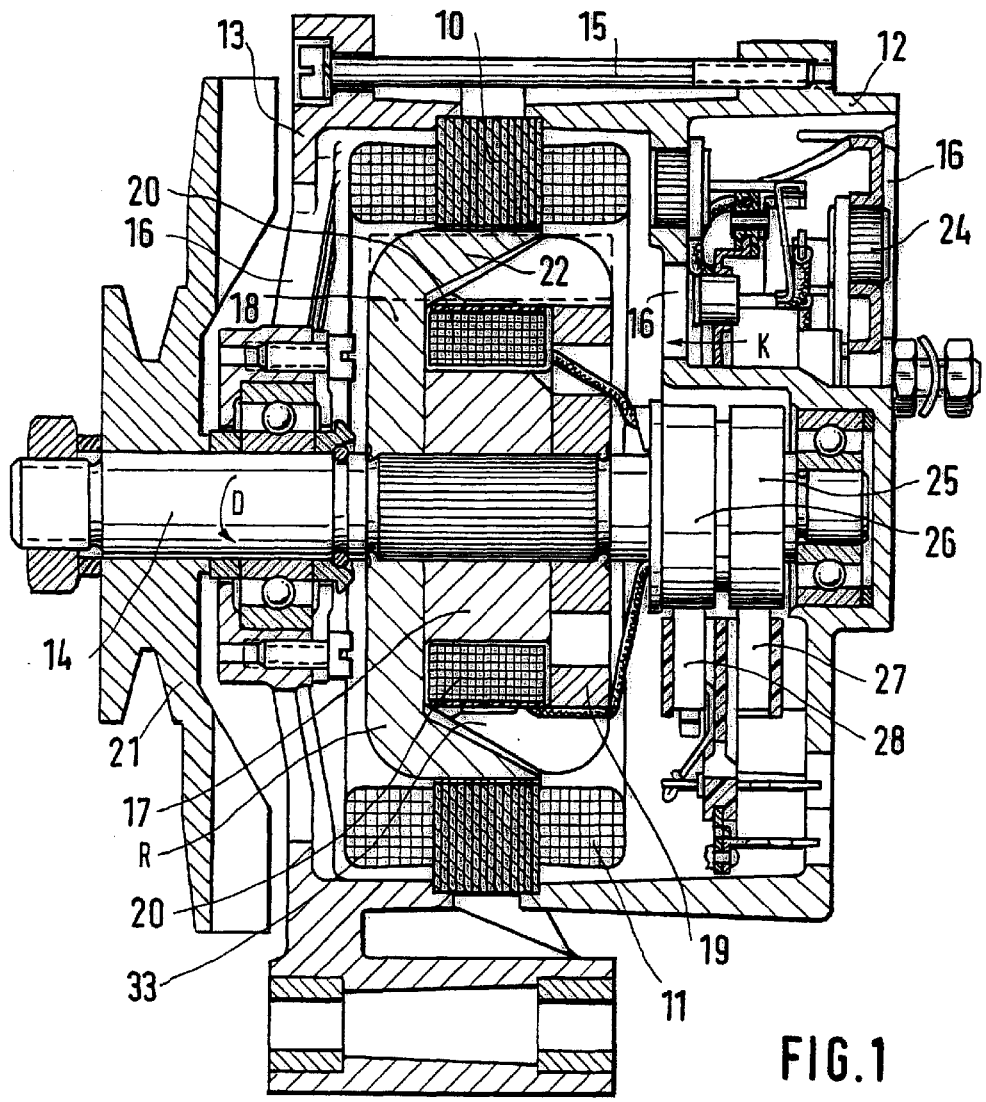
FIG. 1 is a view showing a longitudinal section of an electrical claw pole generator in accordance with the present invention, in particular for a current supply of an electrical system of vehicles.

FIG. 1 shows a rotary current generator with a ring-shaped stator 10 composed of a plurality of metal sheets. It supports a three-phase rotary current winding 11. The stator is clamped between a cup-shaped bearing plate 12 and a bearing cover 13 by means of clamping screws 15. The bearing plate 12 and the bearing cover 13 have a plurality of passages 16 for the passage of a cooling stream identified with reference K. It extends through the generator in an axial direction.

A rotor shaft 14 is supported with not shown ball bearings in the bearing plate 12 and the bearing cover 13. In the region of the stator 10 it carries a claw pole wheel identified with reference R. The claw pole wheel includes substantially a tubular soft iron core 17 which is seated directly on the rotor shaft 14, pole disks 18 and 19 located between its end sides and an exciter coil 20 which is wound on the core. A fan wheel 21 is mounted on the shaft end which projects outwardly beyond the bearing plate 12. It aspirates the cooling air stream K through the generator. In generators with compact design the fans are however arranged directly on the end sides of the pole disks 18, 19.

The claw pole rotor R has six claw pole pairs which are formed on the pole disks 18 and 19. The claw poles 22 on one pole disk 18 and the claw poles 23 on the other pole disk 19 are distributed over the periphery of the claw pole rotor so that they engage in one another like fingers. Also, the claw poles in the axial direction reduce trapeze-shaped with respect to their free ends and are oppositely polarized to one another, when exciter current flows through the exciter coil 20. This current is taken through a controller of the electrical system of the vehicle which is identified with reference numeral 24, and supplied to the exciter coil 20 through two collecting rings 25 and 26, as well as through carbon brushes 27 and 28 which slide on them.

Figure 2:
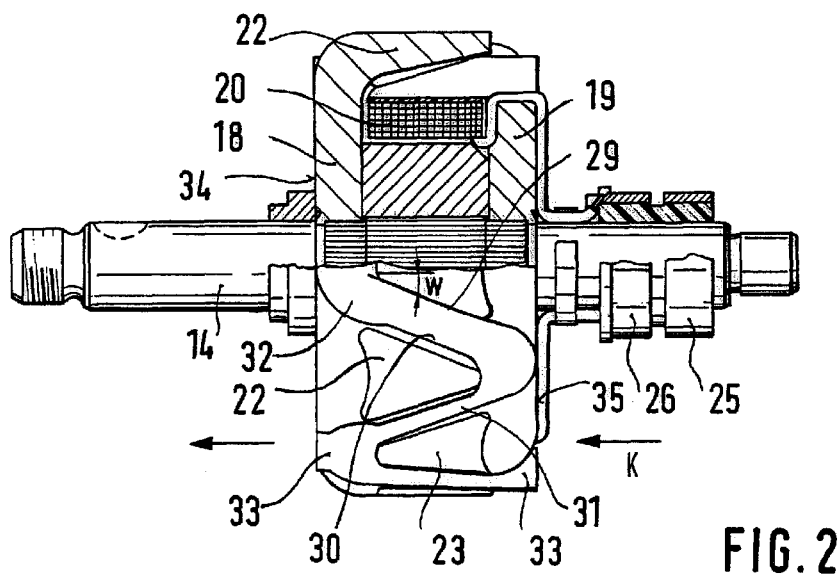
FIG. 2 is a view showing a claw pole rotor of the inventive electrical claw pole generator, partially on a view from one side and partially in an axial section.
Figure 3:
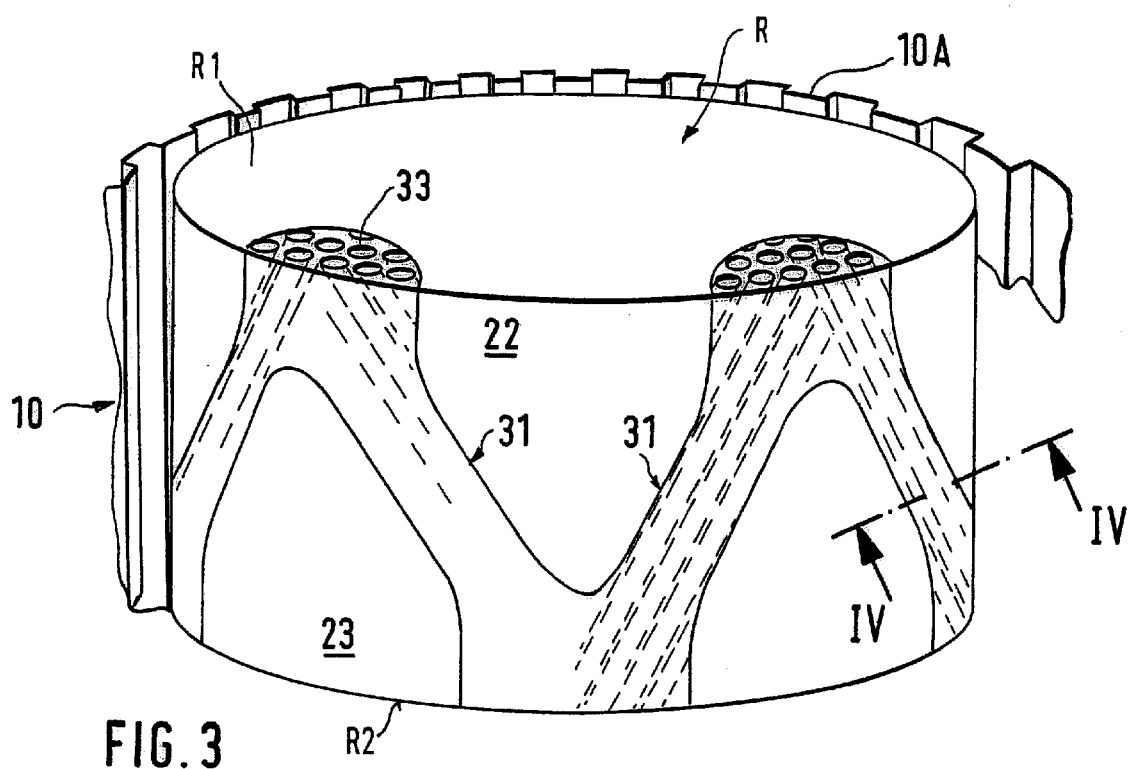
FIG. 3 is a perspective view of the claw pole rotor in a simplified illustration.
Figure 5:
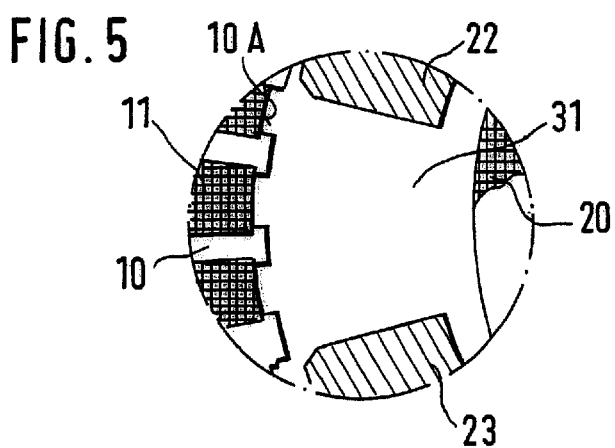
FIG. 5 is a view also showing a section similar to FIG. 4, but without the inventive structures.

As can be clearly seen from FIG. 2, the longitudinal flanks 29 and 30 of the claws extend substantially parallel to one another. They enclose a plurality of intermediate spaces 21 there between. As can be seen from FIG. 5, the intermediate spaces 31 of a generator in accordance with the prior art are empty. This leads to the situation that relatively large-volume whirls can be formed in intermediate spaces. They are in alternating actions with the pole claws and with the longitudinal grooves 10A of the stator 10 arranged there with the rotary current winding 11 and lead to noise emission.

Figure 4:
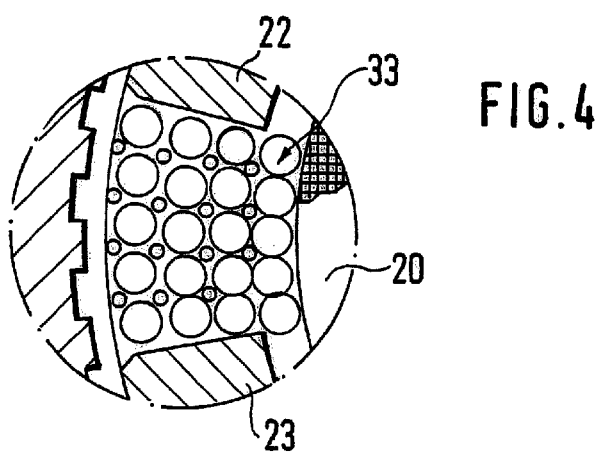
FIG. 4 is a view showing a section which is taken along the line IV—IV in FIG. 3 of the claw pole rotor.
Figure 4A:
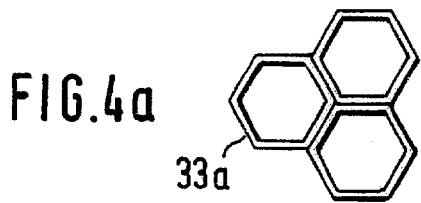

In accordance with the present invention the above mentioned intermediate spaces are filled, for example with honeycombed structures 33 as can be seen from FIGS. 3, 4, 6 and 7. The honeycombs extend in a longitudinal direction of the groove-shaped intermediate spaces 31. These structures are formed as structures 33a which have a round cross-section as shown in FIG. 4 or a multi-cornered cross-section as shown in FIG. 4a. They extend from one end side R1 to another side R2 of the claw pole rotor R.

Figure 4B:
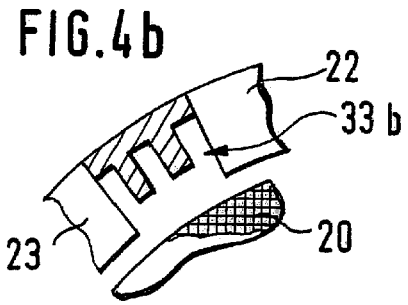

As can be seen from FIG. 4b, the honeycombed structures 33c are open toward an inner side. They are arranged at a small distance from the exciter coil 20 located under them.

Figure 6:
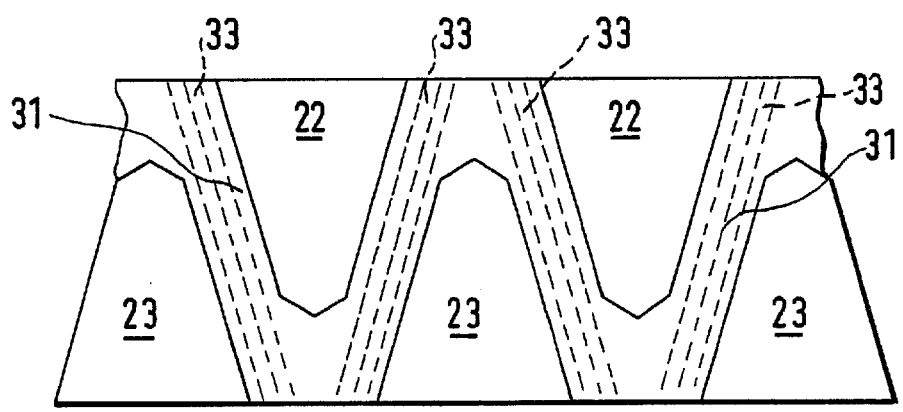
FIG. 6 is a view showing a development of the rotor of the inventive electrical claw pole generator with pole claws and groove spaces.

In FIG. 6 this structure is shown schematically and; illustrated especially clearly.

Figure 7:
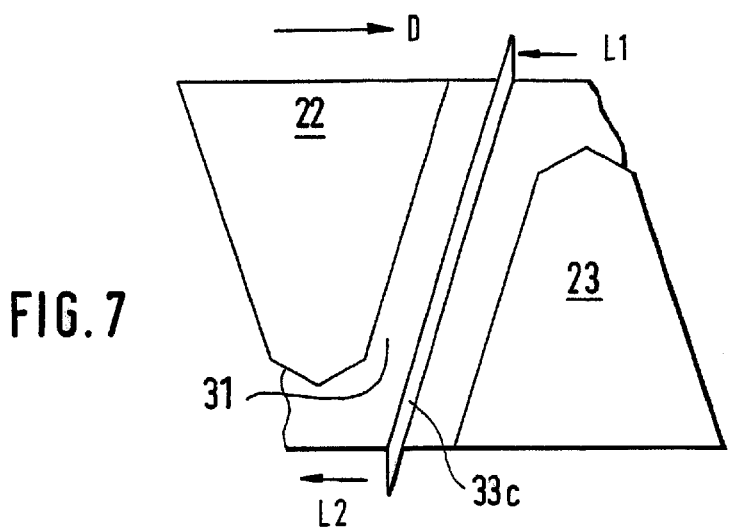
FIG. 7 is a view showing a principle diagram similar to that shown in FIG. 6.

FIG. 7 shows a principle view of this structure. The rotary direction of the rotor is identified here with reference D. An individual honeycombed tube 33c is shown in a longitudinal section between both claw poles. It projects at the ends on the rotor and is inclined so that the air stream identified with L has a pressure above identified with reference L1 and a suction below identified with reference L2. A pressure build up is also possible due to suitable inwardly located fans or fan inlet and outlet of different cross-sections. In this way an especially intensive air flow through the rotor R can be obtained. The structures extend in the radial direction close to the exciter winding 20.

The above described closing of the intermediate spaces 31 with the now smooth outer surface of the rotor R by the honeycombed structures 33 reduces the noise generation and simultaneously improves the cooling of the rotor R. The heat withdrawal to a passing fluid is independent from fluid quantity, flow speed, type of the flow (turbulent) and the total area of the overflown surface. The heat transfer is performed in a thin flow/temperature limiting layer between the fluid and the surface. An improved use of the available cooling quantity is possible here especially by a considerable surface increase when compared with the prior art.

By the filling of the intermediate spaces with the structures which are thermally coupled on the pole claws and the rotor windings, a substantial surface increase is provided. The honeycombed structures are oriented in a groove direction and have a smaller diameter. This provides a small border layer thickness and a laminar flow. The flow resistance can be maintained low with such structures, as the cooling air flow is throttled very little. Advantageously, the honeycomb structures are composed of non magnetic, light metal or heat-conductive synthetic plastic.

It will be understood that each of the elements described above, or two or more together, may also find a useful application in other types of constructions differing from the types described above.

While the invention has been illustrated and described as embodied in electrical machine, in particular claw pole generator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. An electrical machine formed as claw pole generator, comprising a ring-shaped stator provided with windings; a claw pole rotor rotatably arranged inside an opening of said stator, said claw pole rotor having a rotor shaft, pole discs, and an exciter coil arranged coaxially to said rotor shaft, said claw pole rotor also having a peripheral surface provided with a plurality of claw poles which overlap said exciter pole and engage in a finger-like manner with groove-shaped intermediate spaces; at least one axially acting fan means arranged at an end side of said claw pole rotor in a region of an outer periphery; and a plurality of honeycombed structures located in said intermediate spaces and extending in a longitudinal direction of said intermediate spaces so that a cooling medium flows through said honeycomb structures, said honeycomb structures extending outwardly beyond end sides of said pole disks and being inclined opposite to a rotary direction of said rotor.

2. An electrical machine as defined in claim 1, wherein said honeycomb structures fill said intermediate spaces between neighboring ones of said claw poles completely.

3. An electrical machine as defined in claim 1, wherein said honeycombed structures are tubular and have a round cross-section.

4. An electrical machine as defined in claim 1, wherein said honeycomb structures are tubular and have a cornered cross-section.

5. An electrical machine as defined in claim 1, wherein said honeycomb structures are open at a radially inner side.

* * * * *